United States Patent [19]
White

[11] Patent Number: 6,008,746
[45] Date of Patent: *Dec. 28, 1999

[54] METHOD AND APPARATUS FOR DECODING NOISY, INTERMITTENT DATA, SUCH AS MANCHESTER ENCODED DATA OR THE LIKE

[75] Inventor: William A. White, Garland, Tex.

[73] Assignee: Texas Instruments Incorporated, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,297

[22] Filed: Nov. 13, 1996

Related U.S. Application Data

[60] Provisional application No. 60/006,617, Nov. 13, 1995.

[51] Int. Cl.$^6$ .................................................. H03M 5/12
[52] U.S. Cl. ............................................. 341/70; 375/110
[58] Field of Search .................................. 341/70, 69, 71, 341/72; 375/110, 87

[56] References Cited

U.S. PATENT DOCUMENTS

| | | | |
|---|---|---|---|
| 4,862,482 | 8/1989 | Patchen | 375/87 |
| 4,912,730 | 3/1990 | Erhart | 375/110 |

FOREIGN PATENT DOCUMENTS

| | | |
|---|---|---|
| WO 91/01597 A1 | 2/1991 | WIPO . |

*Primary Examiner*—Brian Young
*Attorney, Agent, or Firm*—Mark E. Courtney; W. James Brady, III; Richard L. Donaldson

[57] ABSTRACT

According to a broad aspect of the invention, an apparatus (34) for decoding a Manchester encoded data stream is provided. The apparatus includes a transition detector (45) for receiving the Manchester encoded data stream to produce a transition indicating output when a transition of the Manchester encoded data stream is detected. Also, a circuit (105) is provided to generate an output control pulse a predetermined time after the transition indicating output is produced. A sampling flip-flop (120) receives the Manchester encoded data stream, and is controlled by the output control pulse to output a state of the Manchester encoded data to an output control circuit (125) when the output control pulse is generated. In a preferred embodiment, the sampling flip-flop (125) operates to generate a binary NRZ form of the Manchester encoded data stream. The transition detector (45) may be configured to synchronize the transition indicating output with a pulse of a clock pulse stream, and also may include a phase selector to select either the first or second symbol of the Manchester data to the output of the apparatus.

21 Claims, 10 Drawing Sheets

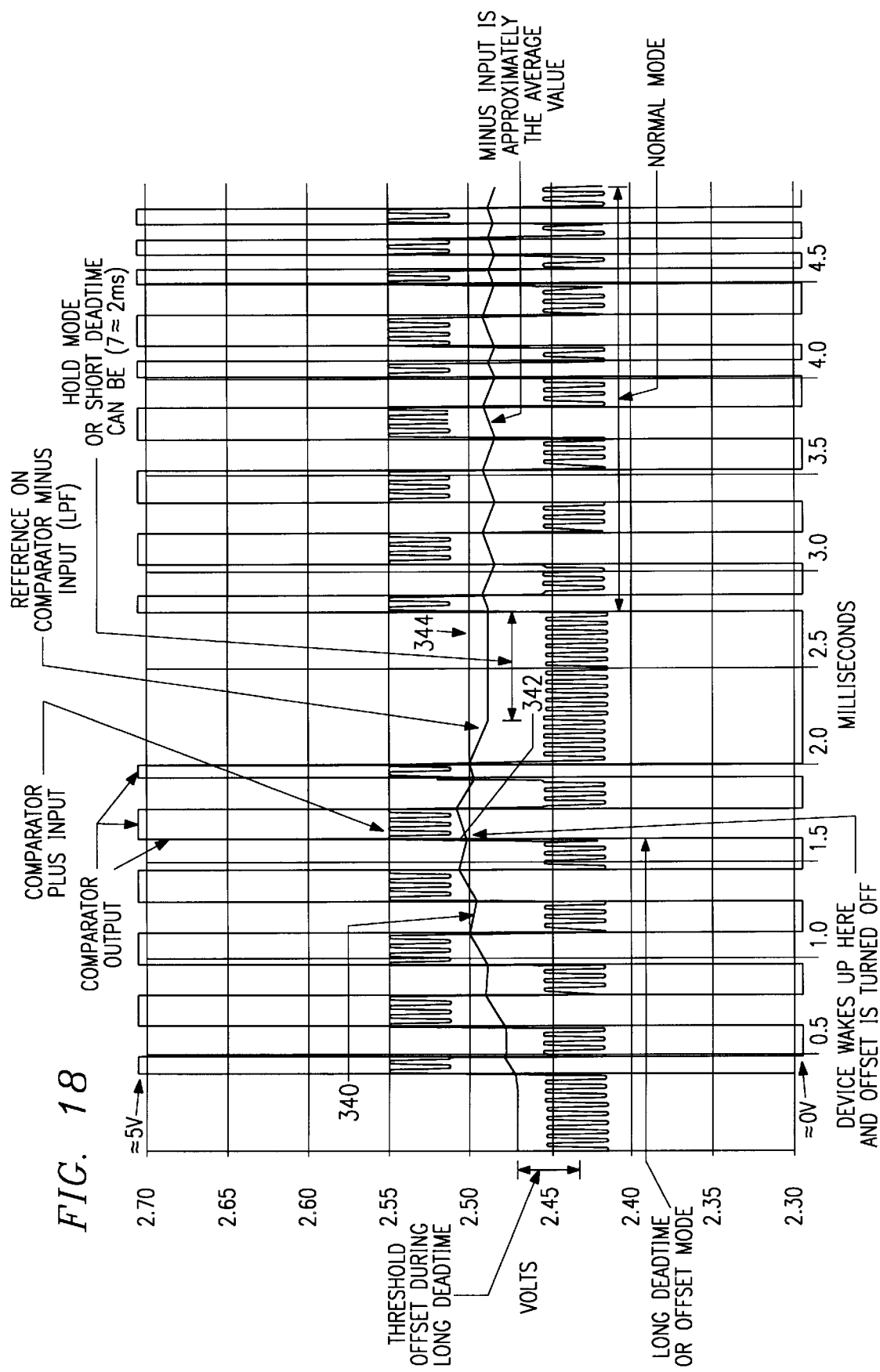

under the page number 6,008,746

METHOD AND APPARATUS FOR DECODING NOISY, INTERMITTENT DATA, SUCH AS MANCHESTER ENCODED DATA OR THE LIKE

This application claims priority of Provisional application Ser. No. 60/006,617, filed Nov. 13, 1995.

BACKGROUND OF THE INVENTION

1. Field of the Invention

This invention relates to improvements in methods and apparatuses for decoding noisy, intermittent data, such as Manchester encoded data, or the like, and additionally relates to methods and circuits having multiple modes of operation depending upon the data signal that is received.

2. Relevant Background

Manchester encoded data is useful for reliably transmitting telemetry and other types of data. Typically, for example, a Manchester encoded data stream may be generated from an encoded telemetry data stream, which may be, for example, a binary nonreturn-to-zero (BNRZ) encoded signal (or data stream encoded by another similar technique), known in the art. Upon receiving the Manchester encoded signal, the signal is decoded to recover the original BNRZ encoded signal. One of the problems inherent in data transmission by any means, especially via radio frequency transmissions, is that the signal becomes noisy, accumulating static, or other rf signals or noise. This makes decoding the Manchester signal difficult to reliably perform.

Manchester encoding, which is widely used in data transmission and telemetry fields, defines data states of the signal to be encoded by the direction of midpoint transitions in an encoding signal, which will become the Manchester encoded data stream. The Manchester encoded data stream has time sequential "cells" of equal duration. At the midpoint of each cell, the data changes state in a direction that indicates the state of the signal to be encoded.

Thus, for example, a transition from a high to low logic state indicates that the signal to be encoded is in a logic low state. On the other hand, a transition from a low to high logic state indicates that the signal to be encoded is in a logic high state. Of course, at the end points of each cell, the state of the signal that will form the Manchester encoded data stream must be set up or established to enable the next midpoint transition. Thus, if a logic zero is to be encoded, the signal that will form the Manchester encoded data stream must be in an initial logic high state so that the midpoint transition from high to low can be realized. Alternatively, if a logic one is to be encoded, the signal that will form the Manchester encoded data stream must be in an initial logic low state so that the midpoint transition from low to high can be realized.

It can therefore be seen that if a series of logic states that are the same are encoded, the resulting Manchester encoded signal will be a square wave of period equal to the length of the cell. On the other hand, if a series of alternate logic ones and zeros are to be encoded, the resulting Manchester encoded signal will be a square wave of period equal to twice the length of the cell.

Various methods for decoding Manchester encoded data have been proposed. One popular technique is to use a phase locked loop circuit. In practice, however, sometimes a Manchester encoded signal is formatted to provide a "wake up" sequence, such as ten data cells, followed by a short dead time, followed by the actual data. Since the wake up sequence is so short, only 10 data cells, the circuit might not lock and might drift during the short dead time. Thus, the commonly used phase locked loop decoding technique cannot be used.

Other decoding techniques employ analog and digital matched filters, integrate and dump schemes, and highly over sampled digital signal processing techniques. Long synchronization time and high component count preclude the use of most of these schemes.

One method that has been proposed employs a gating circuit that responds to the mid-cell transitions in a Manchester encoded waveform to produce an enabling signal. The enabling signal causes a clock circuit to generate high frequency clock pulses, which are accumulated in a programmable counter. If the counter exceeds a clock count threshold before the beginning of the following enabling signal, a storage element is caused to sample and store the encoded waveform.

SUMMARY OF THE INVENTION

In light of the above, therefore, it is an object of the invention to provide an improved circuit and method for Manchester data decoding and timing recovery.

It is another object of the invention to provide an improved circuit and method of the type described that has various modes of operation, depending upon the nature of the input signal.

It is another object of the invention to provide an improved circuit and method of the type described that has a "wake up" mode of operation in which no output is produced until a predetermined sequence of Manchester data is received.

It is another object of the invention to provide an improved circuit and method of the type described that has a "hold" mode in which a predetermined dead time period may occur in which no Manchester data is received, and during which the biases of the circuit are maintained.

These and other objects, features and advantages of the invention will be apparent to those skilled in the art from the following detailed description of the invention, when read in conjunction with the accompanying drawings and appended claims.

According to a broad aspect of the invention, an apparatus for decoding a Manchester encoded data stream is provided. The apparatus includes a transition detector for receiving the Manchester encoded data stream to produce a transition indicating output when a transition of the Manchester encoded data stream is detected. Also, a circuit is provided to generate an output control pulse a predetermined time after the transition indicating output is produced. A sampling flip-flop receives the Manchester encoded data stream, and is controlled by the output control pulse to output a state of the Manchester encoded data when the output control pulse is generated.

In a preferred embodiment, the sampling flip-flop operates to generate a binary NRZ form of the Manchester encoded data stream. The transition detector may be configured to synchronize the transition indicating output with a pulse of a clock pulse stream, and also may include a phase selector to select either the first or second symbol of Manchester data for latching and outputting from the apparatus.

According to another broad aspect of the invention, a wake up circuit for initiating operation of a Manchester encoded data detector from a quiescent state in response to a Manchester data wake up sequence in an input signal is provided. The circuit includes a low pass filter circuit and hold circuit which is initially off to receive the input signal when the Manchester encoded data detector is in the quiescent state. The low pass filter circuit produces an output signal corresponding to the average value of the input signal. An offset circuit which is initially on shifts the low pass filter output signal to produce a voltage reference. A comparator circuit produces a data output signal corresponding to the difference between the voltage reference and the input signal. A circuit is provided for determining the time between transitions in the comparator output signal to selectively switch the hold circuit on after a first predetermined time, the hold circuit off and offset circuit on after a second longer predetermined time, and the hold circuit off immediately after any transition. A differential circuit produces an amplified input signal, and a circuit is provided for determining if a predetermined number of data cells have been sequentially received with respective predetermined states within the data output signal of the comparator circuit to selectively switch the offset circuit off.

The wake up circuit may also include a differential amplifier having inverting and noninverting inputs and an output. Also, the comparator circuit may include a first capacitor connected between the inverting input and a reference potential, and a second capacitor connected between the noninverting input and the reference potential. A first resistor may be connected between the input signal and the inverting input so that the voltage at the inverting input corresponds to the average value of the input signal.

The offset circuit may also include a first resistor connected between the inverting input of the differential amplifier and a voltage reference, a second resistor connected between the noninverting input and the input signal. A switch may be connected in series with the first resistor to turn the offset circuit on so that the voltage at the inverting input corresponds to the average value of the input signal plus an offset voltage. The output of the differential amplifier produces the data output signal corresponding to the difference between the average value of the input signal pulse offset voltage and the input signal when the first switch is closed.

The comparator circuit may also include a second switch in series with the first resistor so that when the second switch is closed and the first switch is opened, the output of the differential amplifier produces the amplified difference between the input signal and the average value of the input signal.

According to still another broad aspect of the invention, a method is provided for decoding Manchester encoded data to produce an nonreturn to zero binary representation of the data. The method includes producing a pulse for each transition of the Manchester encoded data, and generating a sampling signal in timed phase with the pulse for each transition of the Manchester encoded data. The Manchester encoded data is then latched at each occurrence of the sampling signal an output of the latched data is produced. An adaptive threshold detection is used to receive the Manchester encoded data with enhanced noise immunity. The step of using adaptive threshold detection, in one embodiment, includes providing a plurality of operating modes at a data input stage of a decoding circuit, such as a "steadystate" mode and "offset" mode of operation. In one embodiment, a "wake-up" mode of operation is provided.

According to yet another broad aspect of the invention, a timing recovery and Manchester data decoding system is presented. The system includes an oscillator providing output pulses and a multimode input circuit connected to receive a input signal that may contain a Manchester encoded data signal and to output a data containing signal. A transition detector is connected to receive the output signal from the multimode input circuit for generating a Manchester transition indicating pulse at every Manchester data transition. A counter synchronized by Manchester transitions circuit is connected to divide the output pulses from the oscillator by a predetermined count to produce output pulses starting a predetermined number of oscillator pulses after a Manchester data transition. A divide-by-2 circuit is connected to receive the pulses from the counter circuit to generate a sample command signal, and a sampling circuit is connected to receive the output from the divide-by-2 circuit and the Manchester encoded data to latch the state of the Manchester encoded data in response to the output from the divide-by-2 circuit.

In one embodiment, the timing recovery and Manchester data decoding system may also include a mode decoder circuit, which may be a logic gate array or similar circuit, connected to receive the output count from the counter circuit to provide outputs on preselected counts of the output count from the counter circuit. Also, a mode control circuit may be connected to receive at least some of the outputs of the mode decoder circuit, the mode control circuit being connected to selectively control the mode of the multimode input circuit.

The timing recovery and Manchester data decoding system may also include an output control circuit connected to receive the data latched by the sampling circuit and the transition indicating pulses for producing an NRZ output data signal and output timing pulses, and, if desired, a circuit to delay the output timing pulses by one half cycle of the oscillator frequency.

The multimode input circuit in one embodiment has a "steady-state" mode in which a signal that contains a Manchester encoded data stream is processed and an output binary NRZ signal is produced at the output, an "offset" mode during which the occurrence of a wake up Manchester data sequence is needed to cause the circuit to "wake-up" to assume and resume the "steadystate" operating mode, and a "hold" mode during which circuit biases are maintained even though "steady-state" mode Manchester encoded data is not being received.

The multimode input circuit may include a comparator with inverting and non-inverting inputs, with a first resistor by which the input signal is connected to the non-inverting input, and a second resistor by which the input signal is applied to the inverting input. A third resistor is connected at one end to the inverting input of the comparator. A first switch function is connected in series with the second resistor, and a second switch function is connected between another end of the third resistor and a reference voltage. A first capacitor is connected between the inverting input of the comparator and ground, and a second capacitor is connected between the non-inverting input of the comparator and ground. The first and second switch functions are controlled by the mode control circuit.

According to still another broad aspect of the invention, an apparatus for producing an NRZ data signal corresponding to second half states of Manchester cells in a Manchester data stream is provided. The apparatus includes an oscillator to produce a stream of clock pulses and a pulse generator connected to receive the Manchester data stream for generating an output pulse at each transition in the Manchester data stream. A divide-by-n counter is connected to be clocked by the clock pulses from the oscillator and reset by pulses from the pulse generator, the divide-by-n counter having an output that changes state after a predetermined number of the clock pulses. A timing flip-flop is connected to be clocked by the output from the divide-by-n counter, the flip-flop being connected to produce an output on every second count of the output from the divide-by-n counter. A sampling flip-flop is connected to receive the Manchester data stream on a data input and an output of the timing flip-flop on a clock input. The sampling flip-flop provides the then existing state of the Manchester data stream at an output when the sampling flip-flop is clocked. A sequence counter is connected to receive the output of the divide-by-n counter on a clock input and the output pulses from the pulse generator on a reset input, whereby the sequence counter produces a signal indicating when a double wide Manchester pulse has occurred, the signal being connected to reset the timing flip-flop.

According to yet another broad aspect of the invention, a method for producing an NRZ data signal corresponding to states of a known half of each Manchester cell in a Manchester data stream is presented. The method includes the steps of generating a transition pulse at each transition in the Manchester data stream, and generating a series of timing pulses having a frequency n times a frequency of the Manchester cells in the Manchester data stream. The series of timing pulses is restarted in response to each transition pulse, and a current state of a Manchester cell is latched upon the occurrence of each $m^{th}$ timing pulse, wherein m greater than n/2. The timing pulses are concurrently counted to provide a timing pulse count, the count being restarted in response to each transition pulse. If the timing pulse count becomes greater than n/2, the latching is advanced to latch the Manchester data stream upon the next $(n/2)^{th}$ occurring timing pulse.

In still yet another broad aspect of the invention, a method for producing an NRZ data signal corresponding to second half states of Manchester cells in a Manchester data stream is presented in which a series of timing pulses having a frequency twice the frequency of the Manchester cells in the Manchester data stream is generated. A current state of a Manchester cell is latched upon the occurrence of each second timing pulse. The occurrence of a double wide pulse in the Manchester data stream is detected, and the latching is resynchronized to begin on a next occurring timing pulse after the double wide pulse has been detected.

BRIEF DESCRIPTION OF THE DRAWINGS

The invention is illustrated in the accompanying drawings, in which:

FIG. 18 is a series of detailed waveforms at various nodes of the input comparator circuit during a wake-up sequence, in accordance with one aspect of the present invention.

In the various figures of the drawings, like reference numerals are used to denote like or similar parts.

DETAILED DESCRIPTION OF THE PREFERRED EMBODIMENTS

Figure 1:
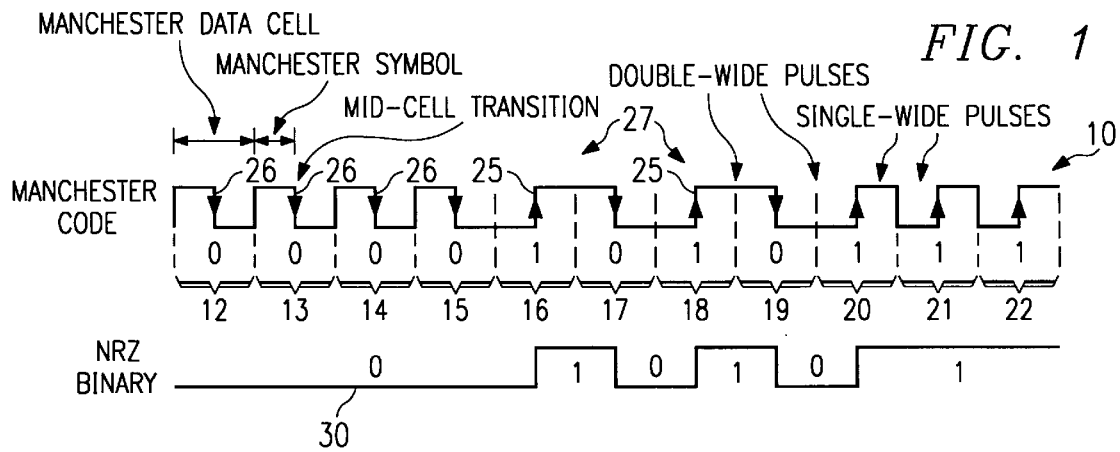
FIG. 1 shows a typical Manchester data stream and a nonreturn to zero data stream derived therefrom using the timing recovery and decoding system, in accordance with a preferred embodiment of the invention.

FIG. 1 shows an example of Manchester encoded data. The waveform 10 has a sequence of equal length data cells 12–22, with each cell representing a bit of corresponding binary data. There are transitions at the midpoint of every cell, which divide the Manchester data cells into two intervals or symbols. Positive going mid-cell transitions, such as the transitions 25, represent binary 1's; negative going mid-cell transitions, such as the transitions 26, represent binary 0's.

A constant series of 0's or a constant series of 1's produce identical square waves with pulse widths equal to a symbol time and periods equal to a cell time, such as the cells 12–15 or the cells 20–22. The waveforms differ only in phase. They cannot be distinguished without other information such as whether two adjacent symbols are in the same cell or are in adjacent cells, or, equivalently, whether a transition is at mid-cell or at a cell boundary.

In contrast to constant 1's or constant 0's, the Manchester representation of alternate 1's and 0's is not ambiguous. A "10" results in a two symbol wide Manchester high, such as represented by cells 16 and 17, and a "01" produces a two symbol wide Manchester low, such as represented by cells 17 and 18. These double wide pulses always straddle a cell boundary, and thus provide a basis for orienting the timing reference, which is used in the implementation of one circuit embodiment of the present invention. Once the timing reference is established, single wide pulses representing constant data can be correctly decoded.

Figure 2:
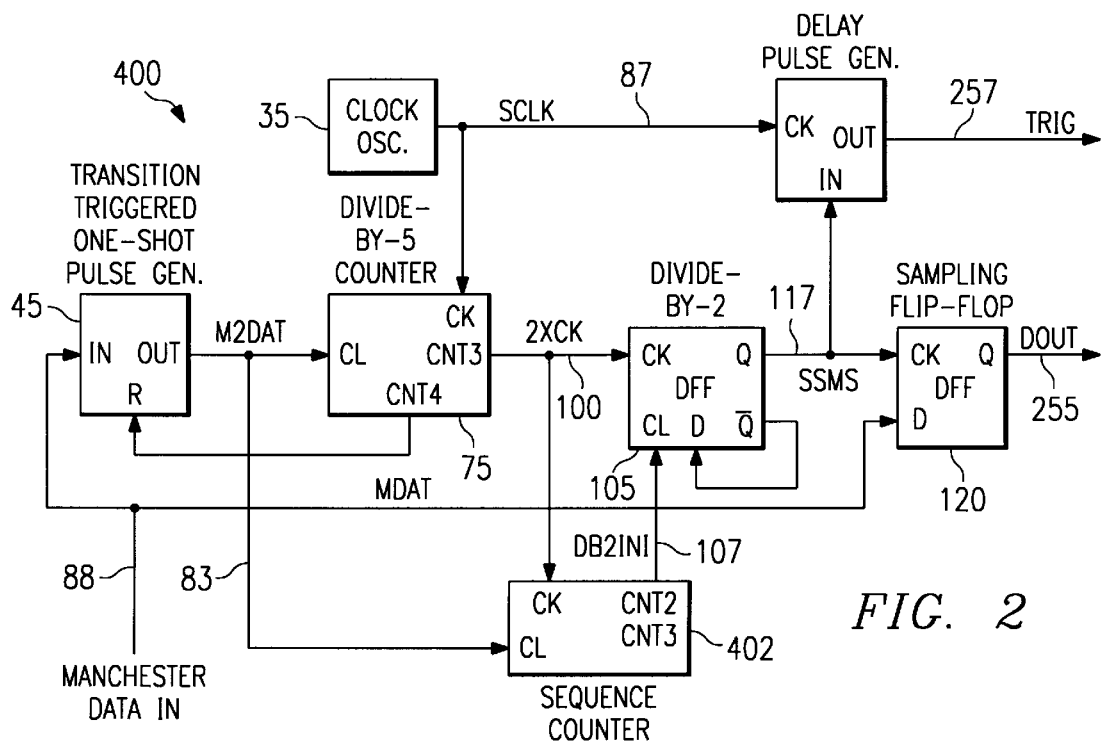
FIG. 2 is an electrical block diagram of a general system for decoding Manchester data, illustrating, in conjunction with the various waveforms shown in FIG. 3, the overall operation of the system and the mechanism for synchronizing the system to detect a predetermined half of each Manchester data cell, in accordance with a preferred embodiment of the invention.
Figure 3:
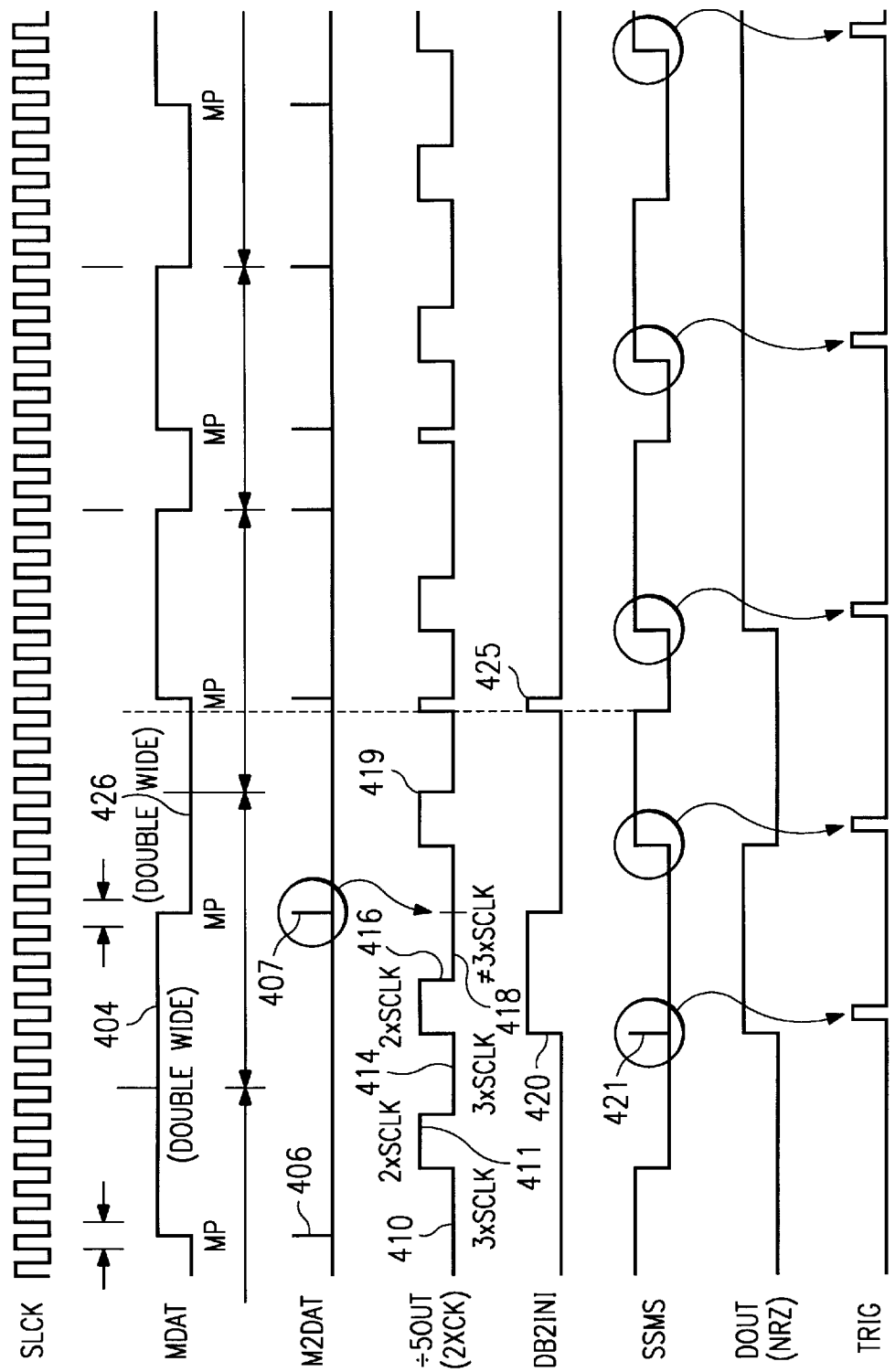
FIG. 3 shows a series of waveforms generated in the operation of the circuit of FIG. 2, showing the manner by which the system automatically identifies the existence of valid Manchester data, and by which the system decodes it.

A general electrical block diagram of a system 400 for decoding Manchester data is shown in FIG. 2, in which the overall operation of the system is illustrated in conjunction with the various waveforms shown in FIG. 3. Timing for the system is provided by an oscillator 35, which produces a stream of clock pulses, labeled "SCLK," as seen in FIG. 3. The Manchester data stream to be decoded, denoted MDAT, is brought into the system 400 on an input line 88, decoded data, denoted DOUT, is outputted from the system on line 255, and decoded timing, denoted TRIG, is outputted on line 259.

The Manchester data is initially connected to the input of a transition triggered one-shot pulse generator 45 (referred to herein as the transition detector 45), which generates a single output pulse at each positive or negative going data transition, the output pulses being denoted M2DAT on line 83. Representative waveforms for MDAT and M2DAT are shown in FIG. 3. It can be observed from FIG. 3 that MDAT is not necessarily synchronous with the clock pulses SCLK from the oscillator 35, but that a M2DAT pulse exists at each transition of MDAT.

The M2DAT output signal from the transition detector 45 on line 83 is connected to clear or reset a divide-by-5 counter 75, which is connected to be clocked by the clock pulses SCLK from the oscillator 35 on line 87. The divide-by-5 counter 75 has various separate outputs for each count, the output for count 3 (herein "the count-3 output") being connected to clock a D-type flip-flop 105, and the output for count 4 being connected back to reset the transition detector 45. The output from the divide-by-5 counter 75 is a waveform, labeled 2XCK, having a frequency that is twice the expected frequency of the Manchester data signal MDAT.

In normal operation, the D-type flip-flop 105 clocks a sampling D-type flip-flop 120 at each second transition of the 2XCK signal, corresponding to the second half of the detected Manchester cell. Since the output of the divide-by-2 D-type flip-flop 105 is connected to clock the sampling D-type flip-flop 120, whenever the signal SSMS from the D-type flip-flop 105 changes state from negative to positive, the sampling D-type flip-flop 120 clocks the state of the then existing Manchester data on line 88 to the output, DOUT, on line 255. The sampling, D-type flip-flop 120, therefore, produces an NRZ data output, DOUT, on line 255, replicating the state of the Manchester data from each successive time that the D-type flip-flop 120 is clocked.

It will be appreciated that if appropriate synchronizing precautions were not taken, it would be possible for the system to lock onto a data decoding sequence of 2XCK pulses that correspond to the timing of the first half of the Manchester data cells. Thus, the count-3 output from the divide-by-5 counter is also connected to clock a sequence counter 402. The sequence counter 402 operates to count a predetermined number of transitions of the 2XCK signal before being reset by the M2DAT signal on line 83. For example, in the embodiment illustrated, two transitions of the 2XCK signal are counted before the count-2 output of the sequence counter 402 produces a state change. Therefore, the output from the count-2 output of the sequence counter 402 provides a signal DB2INI on line 107 that indicates the occurrence of a double wide pulse in the Manchester data, and serves to reset the divide-by-2 D-type flip-flop 105.

As mentioned, in the embodiment illustrated, the second half of the Manchester cell is desired to be sampled. Consequently, an orientation process is initiated by detecting when two consecutive 2XCK pulses occur during a single state of MDAT pulse (i.e., a state in which a midpoint transition is expected, but does not occur). More particularly, with reference to FIG. 3, whenever two consecutive 2XCK pulses occur without an intermediate Manchester data state change, indicating a "double-wide" Manchester data pulse has occurred, such as the pulse 404 or the pulse 426, the output DB2INI on line 107 changes state to clear the D-type flip-flop 105 to synchronize the system to the second half of each Manchester data cell.

For example, the first MDAT pulse 404 shown is a "doublewide" pulse, produced, for instance, by a "01" or "10" value of the data represented by the Manchester signal to be decoded. The double-wide pulse produces transitions 406 and 407 in the M2DAT signal at its respective positive and negative going transitions. The first M2DAT pulse 406 resets the divide-by-5 counter, which proceeds to count clock pulses SCLK. It also resets the sequence counter 402. The output 2XCK on the count-3 output stays low, as shown by the signal segment 410, until three clock pulses have occurred, at which time the count-3 output is set. The count-3 output stays high for two additional counts, shown by the pulse segment 411, until the divide-by-5 counter reaches the count of 5.

At that time, since no state change has occurred in the Manchester data pulse 404, no transition detecting pulse was generated in the M2DAT stream, so the divide-by-5 counter proceeds to immediately count a new data sequence. After the second count of 3, the output of the divide-by-5 counter changes state, shown by the 2XCK data stream segments 414 and 416. Additionally, since the sequence counter 402 was not reset, due to the absence of an MDAT transition, when the second consecutive 2XCK pulse 416 occurs, a synchronizing pulse DB2INI is generated. It can be seen that following a double-wide Manchester pulse, the next occurring state change will be a proper midpoint transition. Thus, when the DB2INI pulse resets the divide-by-2 D-type flip-flop 105, upon the occurrence of the next occurring 2XCK signal, the divide-by-2 D-type flip-flop 105 generates an SSMS signal, assured to be in the second half of the Manchester cell, to clock the sampling D-type flip-flop 120, thereby synchronizing the system to sample the second halves of subsequently occurring Manchester data cells.

Still more particularly, as shown, following the Manchester, data pulse segment 404 the Manchester data signal experiences a midpoint transition to segment 426 prior to the next count of 3 SCLK pulses in segment 418 of the 2XCK signal. This causes a transition indicating M2DAT pulse 407 to be generated, which resets the divide-by-5 counter and starts a new count. The next occurring 2XCK pulse 419, which occurs in the second half of the Manchester data cell timing, clocks the D-type flip-flop 105, which in turn clocks the sampling D-type flip-flop 120, which samples and latches the Manchester data existing at that time.

It should be appreciated that although the timing of the 2XCK pulses have been described as being twice that of the Manchester data cells, any multiple, n, may be selected, with appropriate adjustment to the dividers to select the particular 2XCK pulse that occurs during a second half of each Manchester cell. The resetting adjustment provided by the sequence counter may be also changed to reset the output latch to select an appropriate number of pulses by which to activate the latching function, for example, n/2.

At the same time as the data is generated on output line 255, trigger pulses that are synchronized with the clock pulses SCLK on line 87 are generated on the output line 257, labeled TRIG. The relationship of each TRIG pulse to the rising edges of the pulses SSMS can be seen in FIG. 3.

Figure 4:
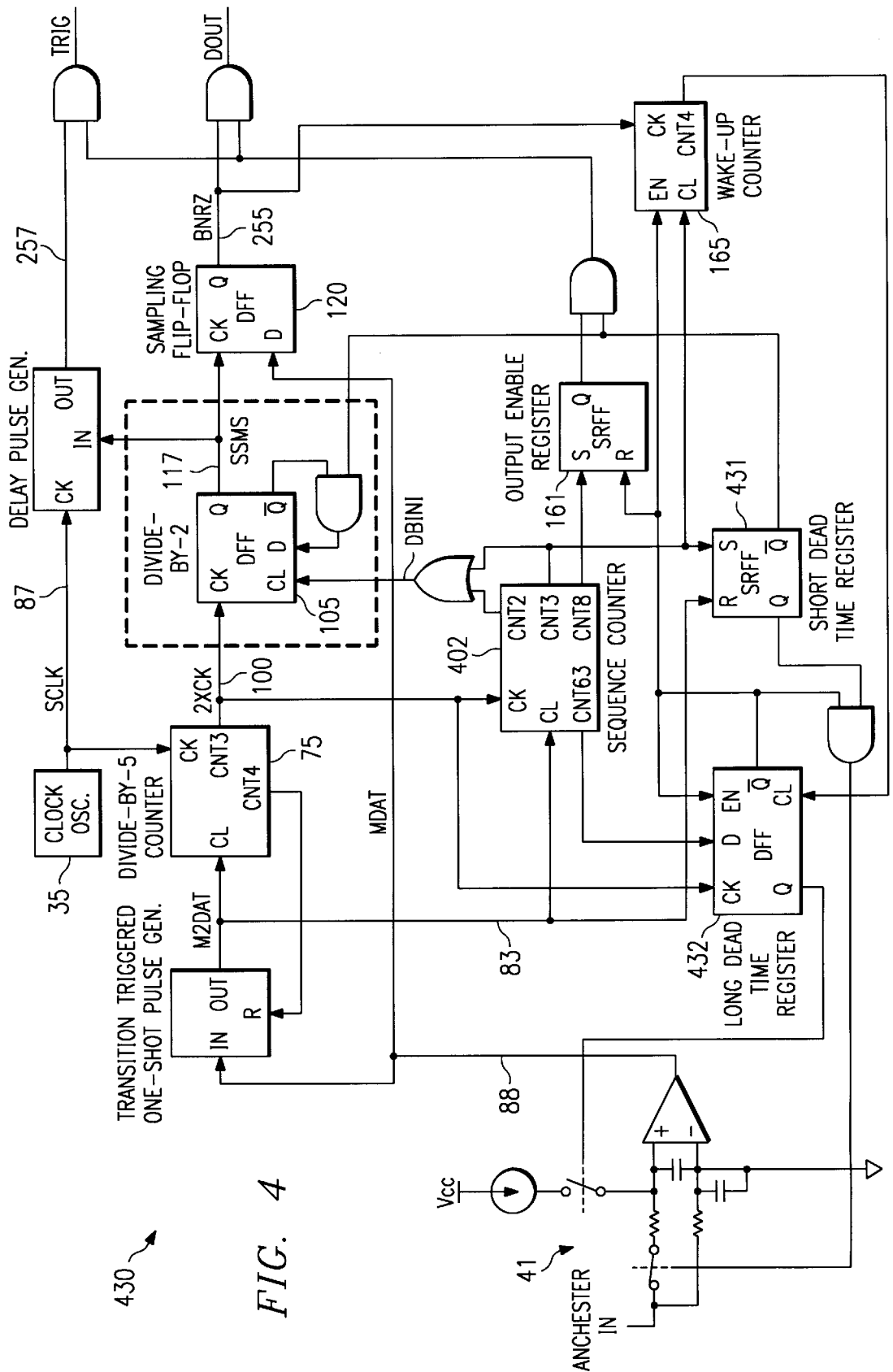
FIG. 4 is an electrical block diagram of a system for decoding Manchester data similar to that of FIG. 2, with additional short and long dead time detection features and with long term sleep and wake-up capabilities, in accordance with the invention.

An electrical block diagram of a system 430 for decoding Manchester data similar to that described above with reference to FIG. 2 is shown in FIG. 4 to which reference now is made. The system 430 shown in FIG. 4 has additional short and long dead time detection features and long term sleep and wake-up capabilities provided by a short dead time register 431 and long time register 432. The short and long dead time registers serve to adjust the thresholds of the input Manchester data conditioning circuit 41 and to disable the outputs of the system 430 when no Manchester data is detected for a predetermined length of time. The operation of the short and long dead time features of the system 430 are described below in detail.

Additionally, the system 430 of FIG. 4 includes a sleep and wake-up feature provided by the long dead time register and a separate wake-up counter 165. The operation of the sleep and wake-up feature are also described below in detail.

Figure 6:
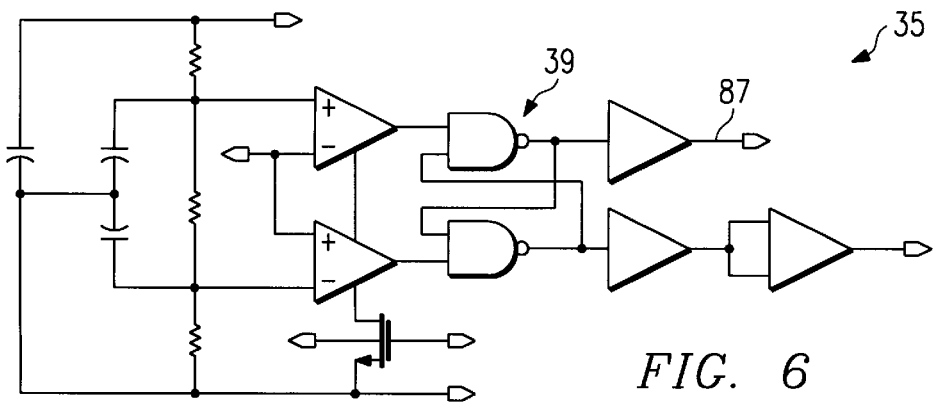
FIG. 6 is an electrical schematic diagram of an oscillator for use in the timing recovery and decoding system of FIG. 5.
Figure 5:
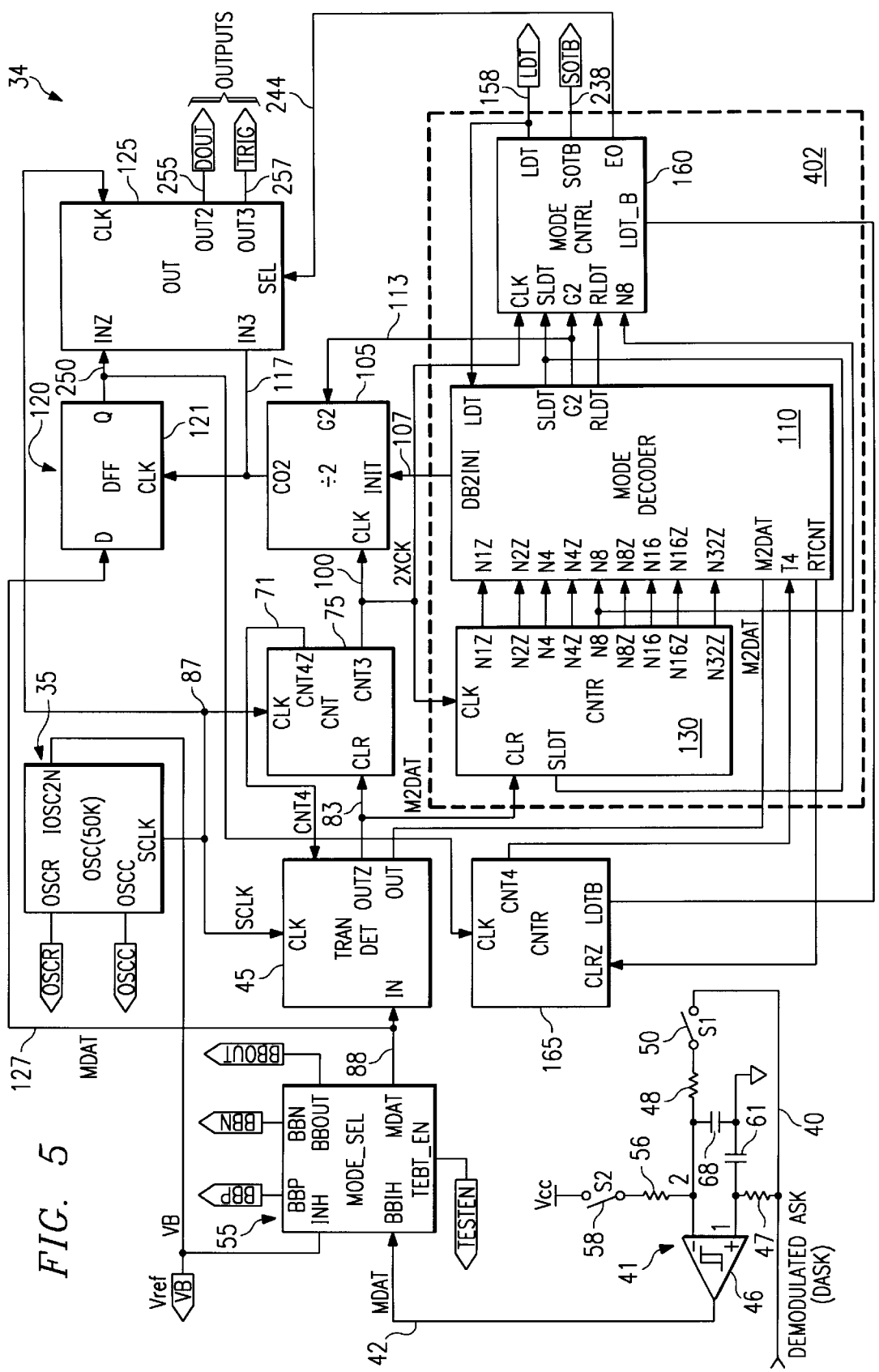
FIG. 5 is a more detailed electrical schematic block diagram showing a timing recovery and decoding system for Manchester encoded data or the like, in accordance with a preferred embodiment of the invention.

Referring now to FIG. 5, a more detailed block diagram of a timing recovery and Manchester data decoding system 34 is shown, in accordance with a preferred embodiment of the invention. A 50 kHz free running oscillator 35 provides the basic timing reference to the remainder of the circuitry. The oscillator 35 may be of standard construction, details of one embodiment of which being shown in FIG. 6. Although the oscillator 35 is shown constructed of discrete logic components, such as the cross-coupled NAND gates 39 shown, the oscillator function can be provided by well known SAW devices, or other suitable oscillator devices or circuits (not shown).

Figure 19:
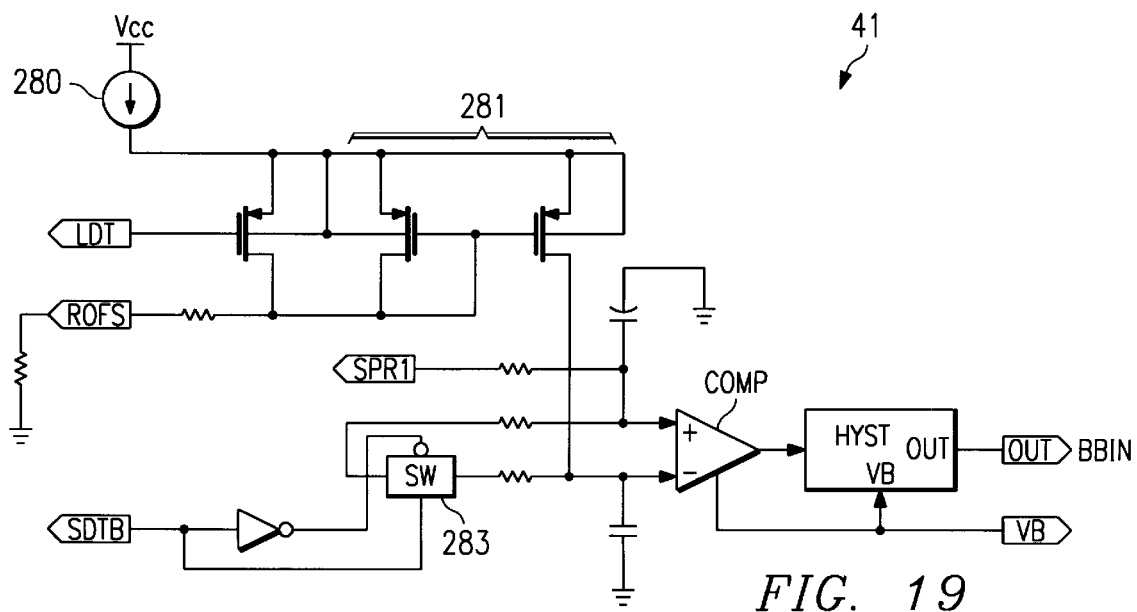
FIG. 19 is an electrical schematic diagram of a threshold detector circuit, in greater detail, for use in the timing recovery and decoding system of FIG. 1.

With reference again to FIG. 5, the input signal, which may contain a Manchester data encoded data stream to be decoded, is connected on an input line 40 to a multimode input circuit 41, which provides its output (MDAT) on line 42 to a transition detector 45. (In the embodiment illustrated, a test mode control circuit 55 is provided, below described in detail, which controls whether the input signal or a test signal is applied to the remaining portion of the timing recovery and Manchester data decoding system 34. The output from the test mode control circuit 55 is then delivered to the transition detector 45.) The multimode input circuit 41 has a comparator 46 with inverting and non-inverting inputs as shown. The input signal is connected to the non-inverting input by a first resistor 47, and to the inverting input by a second resistor 48. A first switch 50, connected in series with the resistor 48, is controlled by a mode control circuit 160, below described in detail. Although the first switch 50 may be provided by a physical switch, or a transistor connected in known switch-function configuration, it will be appreciated that the purpose is to selectively apply the input signal to the inverting input of the comparator 46. Accordingly, equivalent circuitry may be employed to perform this selective voltage application, one example of which being the transfer gate 283 shown, for example, in one implementation of the multimode input circuit 41, shown in FIG. 19.

A third resistor 56 is connected between the inverting input of the comparator 46 and a second switch 58, which also is controlled by the mode control circuit 160. The switch 58 is connected to a reference voltage, such as $V_{cc}$, shown. Again, the second switch 58 may be provided by a physical switch, or a transistor connected in known switch-function configuration; however, it will be appreciated that the purpose is to selectively connect the voltage $V_{cc}$ to the inverting input of the comparator 46. Accordingly, equivalent circuitry may be employed to perform this selective voltage application, one example of which being the current source 280 and mirror circuit 281 shown, for example, in the implementation of the multimode input circuit 41 in FIG. 19. Two capacitors 60 and 61 are connected respectively between the inverting and non-inverting inputs of the comparator 46, and between the non-inverting input and ground.

Figure 7:
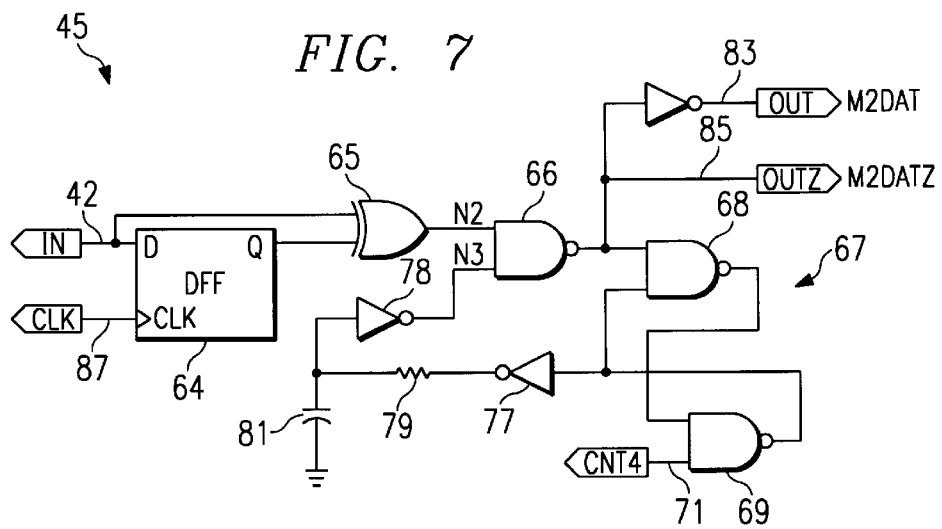
FIG. 7 is an electrical schematic diagram of a transition detector for use in the timing recovery and decoding system of FIG. 5.

The transition detector 45, which generates a positive Manchester transition indicating pulse (M2DAT) at every transition, positive or negative, of Manchester data, receives the output on line 42 from the multimode input circuit 41 on the input of a D-type flip-flop 64, shown in FIG. 7. Clock pulses on line 87 from the oscillator 35 clock the D-type flip-flop 64, the output of which is connected to one input of an exclusive OR gate 65. The output of the exclusive OR gate 65 is connected to one input of a NAND gate 66, the output of which is connected to one input of a flip-flop 67 that includes NAND gates 68 and 69.

Another input of the flip-flop 67 receives a signal on line 71 from a counter 75, below described in detail, to insure that the transition detector 45 does not respond to the second of two transitions that are separated by a time less than a predetermined number of clock pulses, for instance, less than about 60 to 80 microseconds. The output of the flip-flop 67 is connected to the second input to the NAND gate 66 via inverters 77 and 78 and resistor 79. A capacitor 81 is connected between the input of the inverter 78 and ground to provide a low pass filter in conjunction with the resistor 79.

The output from the NAND gate 66 is connected to an inverter 84, which operates to produce a positive pulse (M2DAT), for example of about 12 nanoseconds long, on the output line 83 whenever either a positive or negative transition occurs on the input line 42. An inverted output occurs on line 85, labeled "M2DATZ". Either the first or the second Manchester symbol may be selected by a Manchester transition counter 75, described below, which is clocked by the oscillator 35, and reset upon the occurrence of a Manchester data transition on line 85, as indicated by the Manchester transition indicating pulse (M2DAT).

Figure 8:
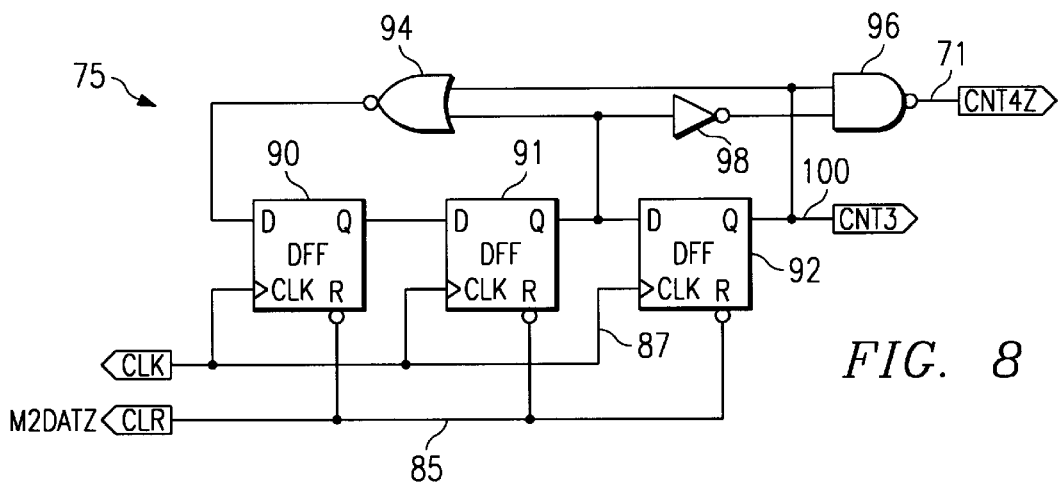
FIG. 8 is an electrical schematic diagram of a transition counter for use in the timing recovery and decoding system of FIG. 5.

Details of a suitable Manchester transition counter circuit 75 are shown in FIG. 8, in which the clock pulses from the oscillator 35 are received on input line 87 and the output from the transition detector circuit 45 are received on input line 85. The Manchester transition counter 75 has three D-type flip-flops 90, 91, and 92 connected to receive the clock pulses on line 87 on their respective clock inputs and the Manchester transition signal on their clear or reset inputs. The output from the first D-type flip-flop 90 is connected to the data input of the second D-type flip-flop 91, and the outputs of the second and third D-type flip-flops 91 and 92 are connected to the input of the first D-type flip-flop 90 by a NOR gate 94. In addition, the output of the second and third D-type flip-flops 91 and 92 are connected to the inputs of a NAND gate 96, the output of the second D-type flip-flop 91 being inverted by an inverter 98.

The Manchester transition counter 75 operates as a modulo 5 clock pulse counter, with the divided clock pulses on output line 100 occurring after three counts produced by the oscillator 35 on line 87, after the counter 35 has been reset by the occurrence of a Manchester data transition on line 85. If no Manchester data transition resetting event occurs, the divided clock pulses on output line 100 are merely the clock frequency divided by five. The signal on output line 71 occurs after every four counts following a Manchester data transition resetting event occurring on line 85, and is connected back to the input of the flip-flop 68 of the transition detector 45, described above.

It should be noted that the particular circuit embodiment of the present invention herein described decodes the Manchester data by sampling and latching the second symbol of each Manchester data cell, as determined by the delay count developed by the Manchester transition counter 75. It will be appreciated that the first symbol of the Manchester data could also be sampled, latched, and decoded by selecting a different delay count, then inverting the data.

Figure 9:
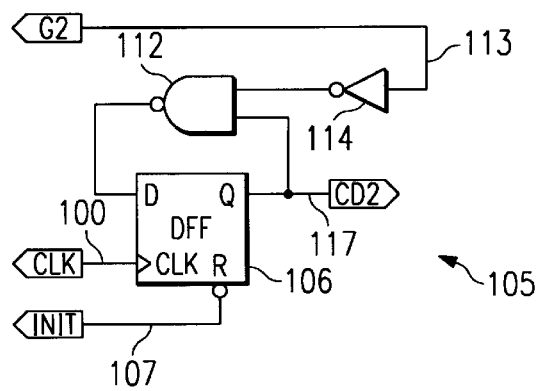
FIG. 9 is an electrical schematic diagram of a divide by two circuit for use in the timing recovery and decoding system of FIG. 5.

The divided clock pulses from the counter 75 on output line 100 is connected to an input of a divide-by-2 circuit 105, details of which being shown in FIG. 9. The divide-by-2 circuit 105 has a D-type flip-flop 106 that receives the divided clock pulses from the counter 75 on line 100 on its clock terminal. The reset line is connected to receive a reset signal from a mode decoder circuit 110, below described in detail. The output of the D-type flip-flop 106 is inverted by a NAND gate 112, and connected to the input. The other side of the NAND gate 112 is connected to receive a signal on line 113 from the mode decoder circuit 110, which indicates that there have been no Manchester data transitions for three consecutive periods of the divided clock pulses on line 100. The signal on line 113 is inverted by an inverter 114.

In operation, the divide-by-2 circuit 105 divides the divided clock pulses on line 100 by two, to generate a sample command signal on output line 117. As will become apparent, a reset signal will be generated on line 107 when two positive edges of the divided clock pulses on line 100 have occurred between any two successive Manchester data transition indicating pulses on line 85. Since a transition must occur between the symbols of each Manchester cell, if two counts of the divided clock pulses on line 100 have occurred between Manchester data transitions, a reset signal generated by the second count insures that the circuit is synchronized to the correct symbol of the Manchester cells, and a double-wide pulse has occurred (compare, for example, the double-wide pulses 27 in FIG. 1). The double wide pulses always overlap the leading edges of two of the divided clock signal pulses on line 100, whereas single wide pulses always overlap only one. Since the reset signal on line 107 resets the D-type flip-flop 106, the operation of the divide-by-2 circuit 105 automatically synchronizes the circuit to detect the correct Manchester symbol upon the occurrence of the next count pulse of the divided clock pulses on line 100, and with every other one thereafter.

After the D-type flip-flop 106 has been reset, the next positive edge of the divided clock pulses on line 100 causes the sample command signal on line 117 to go high, actuating the sample block 120 (below described) to sample the received Manchester data during the second Manchester data symbols. If there are no Manchester data transitions for three consecutive periods of the divided clock pulses on line 100, the signal delivered on line 113 goes high, forcing the output of the NAND gate 112 high. This causes the sample command signal on line 117 to go high upon the occurrence of the next positive edge of the divided clock pulses on line 100. When the Manchester data transitions begin again, the D-type flip-flop 106 is set up to sample the second half of the Manchester cell, since the first positive edge of the divided clock pulses on line 100 will clock the sample command signal on line 117 to its low state. The next positive edge of the divided clock pulses on line 100 clocks the output to a high state, which causes the sample circuit 120 to sample the current Manchester data.

The sampling circuit 120, as shown in FIG. 5, is a D-type flip-flop 121 in the embodiment illustrated. The signal that contains the Manchester data (MDAT) is connected to the data input, and the output is connected to an output control circuit 125, below described. By clocking the D-type flip-flop 121 with sampling pulses of the frequency and phase of the second symbol of each Manchester data cell, the sampling flip-flop 121 correctly samples and latches the Manchester data signal on line 250. At this point it should be noted that since the logic level of the latched Manchester data is constant between samples, the resulting data is a binary nonreturn-to-zero (BNRZ) binary representation of the encoded data, shown by waveform 30 in FIG. 1.

Figure 10:
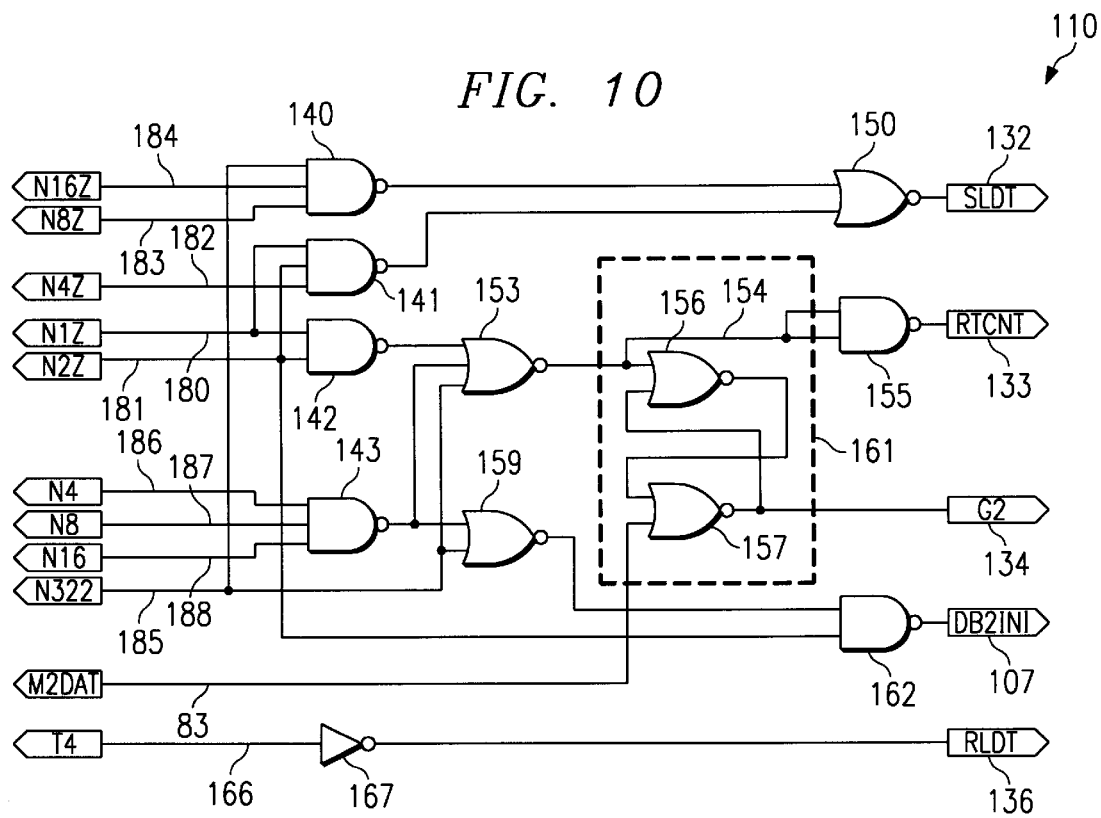
FIG. 10 is an electrical schematic diagram of a mode decoder circuit for use in the timing recovery and decoding system of FIG. 5.

As discussed above, selecting every other divided clock pulse on line 100 provides the correct frequency for the sampling pulse waveform. However, without initialization, there is an equally likely possibility that the sampling pulses will align with the first symbol rather than the second, and the decoded data would be inverted. The proper alignment is determined by the mode decoder circuit 110, which detects the existence of a double wide Manchester waveform. Details of the mode decoder circuit 110 are shown in FIG. 10.

In general, the mode decoder circuit 110 decodes counts from the pulse generator circuit 130, below described in detail, and is essentially a logic gate array that provide outputs on output lines 132–136 and 107 of known logic states for various input count combinations. The circuit has four input NAND gates 140–143, which receive the outputs on lines 180–188 from the pulse generator circuit 130.

The NAND gates 140 and 141 receive their inputs on lines 181–185 from the pulse generator circuit 130. The outputs from NAND gates 140 and 141 are connected to the inputs of a NOR gate 150, which produces an output on line 132 that goes high on count number 63 of the divided clock pulses on line 100, when all of the count signals on lines 180–185 are high. The signal on output line 132 serves to inhibit the input to the pulse generator circuit 130, as below described.

The NOR gate 153 receives the outputs from the NAND gates 142 and 143, as well as an input on line 185 to produce an output on line 154, indicating a count of three of the divided clock pulses on line 100. The line 154 is connected to both inputs of a NAND gate 155, which acts as an inverter, and to one input of a flip-flop 161, defined by NOR gates 156 and 157, to set the flip-flop when the third count has occurred. The output from the NAND gate 155 on line 133 goes low upon the count of three of the divided clock pulses on line 100, and is used to clear the transition counter circuit 165, as below described. Concurrently, the output from the flip-flop on line 134 goes high on the count of three of the divided clock pulses on line 100, and serves to enable the NAND gate of the divide-by-2 circuit 105 (FIG. 9), as described above.

The other input to the flip-flop comprised of the NOR gates 156 and 157 is connected to receive the signal on line 83 from the transition detector 45 (FIG. 7), indicating the occurrence of a Manchester data transition. When a signal is received indicating that a Manchester data transition has occurred, the flip-flop is reset, returning the output state on line 133 to a high state and the output state on line 134 to a low state.

The output from NAND gate 143, as well as the signal on line 185, are connected to the inputs of NOR gate 159. The output from the NOR gate 159, as well as the signal on line 181, are connected to the inputs of a NAND gate 162, which produces an output on line 107 that goes low on the count of two of the divided clock pulses on line 100. The signal on the line 107 serves to reset the D-type flip-flop 106 of the divide-by-2 circuit 105 of FIG. 9. The output signal from the transition counter 165, below described in detail, on line 166 is inverted by an inverter 167, and produced on the output line 136 to reset the D-type flip-flop 135 of the mode control circuit 160, below described.

Figure 11:
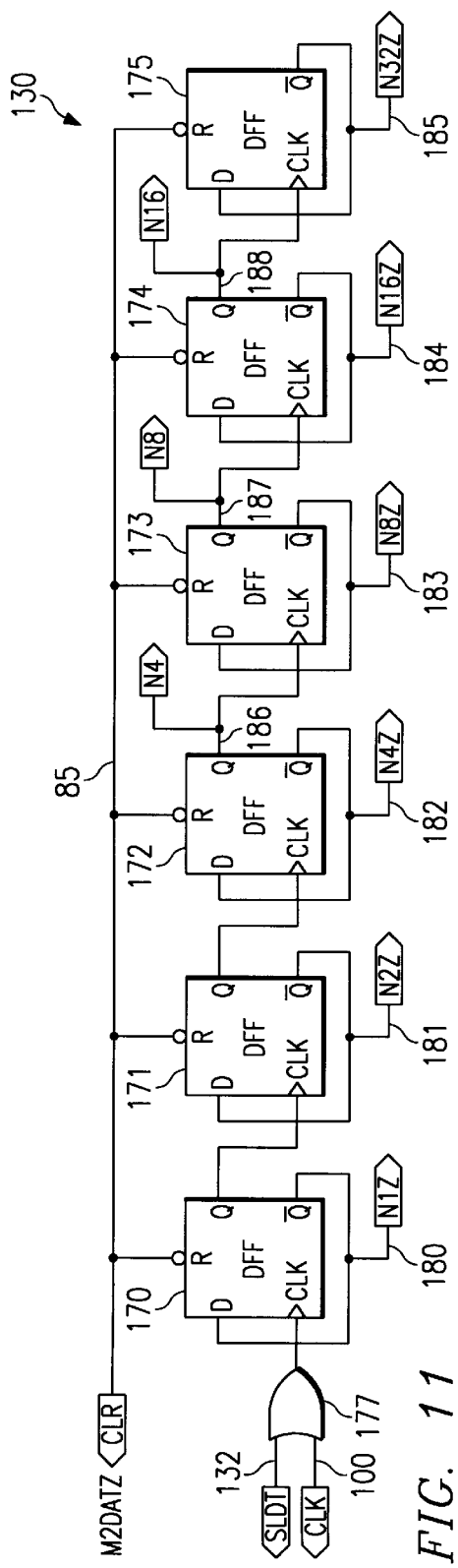
FIG. 11 is an electrical schematic diagram of a pulse generator circuit for use in the timing recovery and decoding system of FIG. 5.

The pulse generator circuit 130 that provides counts of the divided clock pulses on line 100 to the mode decoder circuit 110 is shown in detail in FIG. 11. The pulse generator circuit 130 includes six D-type flip-flops 170–175, connected as a ripple counter. The divided clock pulses on line 100 and the signal indicating that the count has reached 63 on line 132 (from the NAND gate 150 of the mode decoder circuit 110, shown in FIG. 10) are applied to the inputs of an OR gate 177. The counter is reset by the occurrence of a Manchester data transition indicating signal on line 85, and is clocked by the divided clock pulses on line 100, which is enabled by the OR gate 177. The outputs are developed on lines 180–188 and delivered to the mode decoder circuit 110, described above.

The operation of the pulse generator circuit 130 is to count the number of divided clock pulses on line 100 that occur between pulses that indicate transitions of the Manchester data appearing on line 85. The occurrence of a Manchester data transition indicating pulse on line 85 presets the counter to an all "ones" initial state, after which the divided clock pulses on line 100 are sequentially counted. If a count of 64 is reached, the signal from the mode decoder circuit 110 on line 132 goes high, inhibiting further clocking until the next Manchester data transition indicating pulse occurs.

Figure 12:
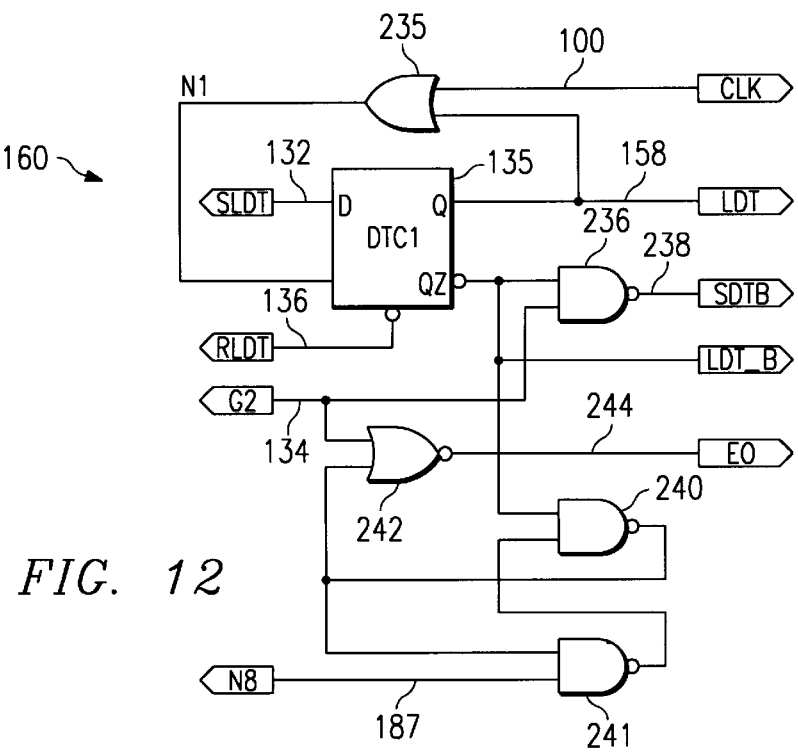
FIG. 12 is an electrical schematic diagram of a mode control circuit for use in the timing recovery and decoding system of FIG. 5.

Additional control signals are generated by the mode control circuit 160, details of which are shown in FIG. 12. The mode control circuit 160 includes a D-type flip-flop 135 connected to receive the output on line 132 from the mode decoder circuit 110 of FIG. 13. The output on line 132 indicates that the count of the divided clock pulses on line 100 has reached 63. The D-type flip-flop 135 is connected to be reset by the output on line 136 from the mode decoder circuit 110 of FIG. 13, which represents the inverted output on line 166 from transition counter 165, below described. The D-type flip-flop 135 is connected to be clocked by the divided clock pulses on line 100, connected via the OR gate 235. The output from the D-type flip-flop 135 is connected to a second input of the OR gate 235 to inhibit the divided clock pulses on line 100 when the output is high.

The inverted output from the D-type flip-flop 135 is connected to one input of a NAND gate 236, the output of which is an output signal on line 238 that is used to control the switch 50 of the input stage 41. The switch 50 also controls the operating mode of the circuit 34. The other input of the NAND gate 236 is connected to receive the output on line 134 from the mode decoder circuit 110, shown in FIG. 10. The signal on line 134 goes high after the occurrence of the third count of the divided clock pulses on line 100.

The inverted output of the D-type flip-flop 135 is connected to set a flip-flop comprised of NAND gates 240 and 241. The flip-flop is reset by the signal on line 187 from the pulse generator circuit 130, corresponding to a count of eight divided clock pulses on output line 100. The output from the flip-flop is connected to one input of a NOR gate 242, which is connected to receive the signal on line 134 at its other input.

The output enable signal on line 244 is connected to enable the output control circuit 125, below described. Thus, in operation, the mode control circuit 160 prevents the output enable signal on line 244 from going high and enabling the outputs of the output control circuit 125 until after a short dead time of eight counts of the divided clock pulses on line 100.

Figure 13:
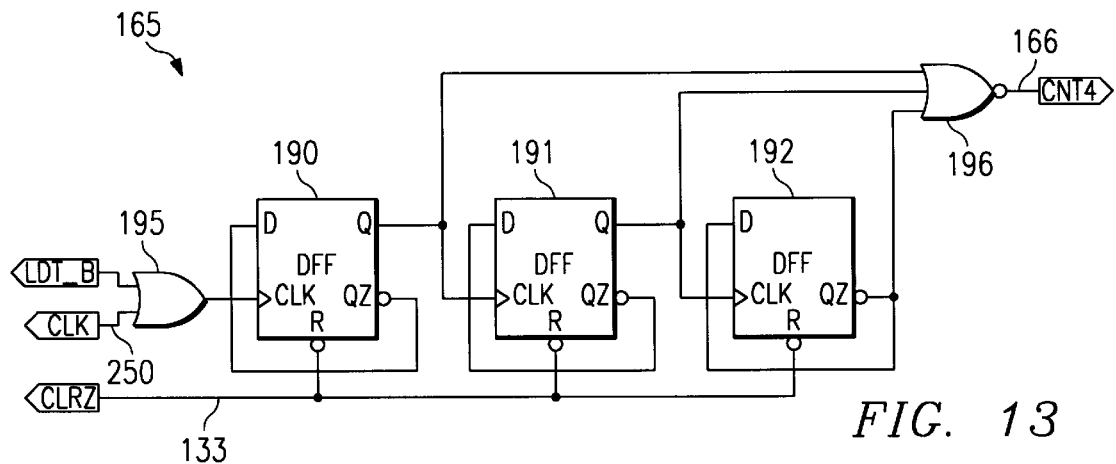
FIG. 13 is an electrical schematic diagram of a transition counter circuit for use in the timing recovery and decoding system of FIG. 5.

The transition counter circuit 165 mentioned above in conjunction with the description of the mode decoder circuit 110, is shown in FIG. 13, and has three D-type flip-flops 190–192. The first D-type flip-flop 190 is clocked by a change in state of the latched Manchester data appearing on line 250 at the output of the sample flip-flop circuit 120, provided the signal LDT-13 from the mode control circuit 160 remains low. When LDT-13 goes high, the OR gate 195 is inhibited from passing further transition signals. The output of the first D-type flip-flop 190 is connected to the clock input of the second D-type flip-flop 191, as well as to a first input of a three input NOR gate 196. The inverted output of the first D-type flip-flop 190 is connected to its data input.

The second D-type flip-flop 192 is similarly connected, with its inverted output connected to its input, and its output connected to the second input of the NOR gate 196 and to the clock input of the third D-type flip-flop 192. In a similar fashion, the third D-type flip-flop 192 is connected with its inverted output connected to its input; however, the inverted output is also connected to the third input of the three input NOR gate 196.

The three D-type flip-flops 190-192 are reset by the signal produced on output line 133 from the mode decoder circuit 110 (FIG. 10), which goes low on the third count of the divided clock pulses on line 100, described above. Thus, the transition counter 165 serves to count four positive edges of the sampled Manchester data, and operates to "wake up" the circuit after a long dead time period. Although the wake up features of the circuit are described below in detail, briefly, if a count of four is reached before the resetting signal occurs on line 133, the output on line 166 goes high, waking up the remainder of the circuit in the manner below described.

Figure 14:
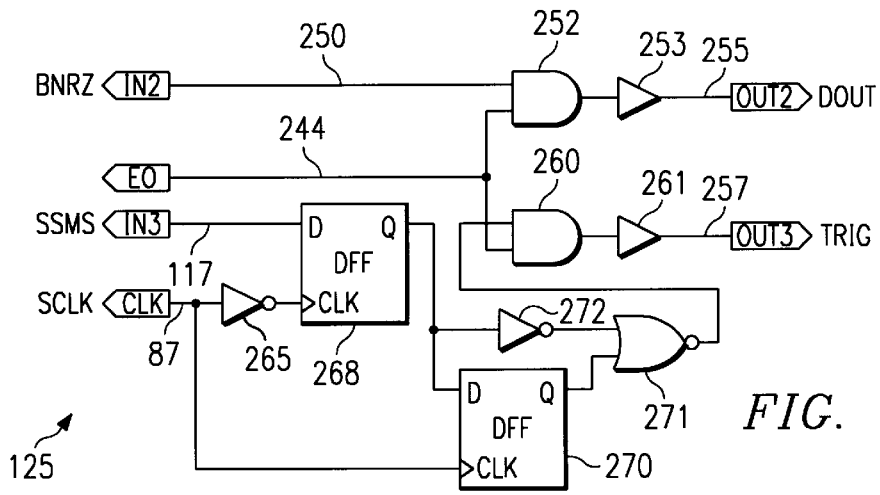
FIG. 14 is an electrical schematic diagram of an output circuit for delivering an NRZ data output and accompanying timing or trigger pulses that have been derived from the input data stream that contains Manchester encoded data, for use in the timing recovery and decoding system of FIG. 5.

The input BNRZ on line 250 to the transition counter circuit is also applied to the output control circuit 125, details of which are shown in FIG. 14. The output control circuit 125 receives the decoded BNRZ signal from the sampling or latching flip-flop 121 into an enabling AND gate 252, which has an output that is buffered by an output buffer 253 to provide a data out signal (DOUT) on the data out line 255. The AND gate 252 is enabled by the output enable signal, which is developed on line 244 from the output of the NOR gate 242 of the mode control circuit 160, described above with reference to FIG. 12.

The trigger or timing output (TRIG) on line 257 is developed by an enabled AND gate 260, the output of which is buffered by the output buffer 261. The AND gate 260 also is enabled by the output enable signal on line 244 from the NOR gate 242 of the mode control circuit 160. The other input to the AND gate 260 is derived from the clock signal from the oscillator 35, developed on line 87, delayed by one-half cycle. The clock signal on line 87 is inverted by inverter 265 to clock the sample command signal on line 117, developed by the divide-by-2 counter 105 described above with reference to FIG. 9, into a D-type flip-flop 268.

The one-half cycle delay of the clock pulses on line 87 is produced by the D-type flip-flop 270, which receives the output from the D-type flip-flop 268 on its data input and the clock pulses on line 87 on its clock input. The output from the D-type flip-flop 270 is connected to one input of a NOR gate 271, the output of which is connected to the AND gate 260. The other input to the NOR gate 271 is the output from the D-type flip-flop 268, which is inverted by an inverter 272.

The timing pulses developed on output line 257 are delayed from a state change of the sample command signal on line 117 at the output of the divide-by-2 counter 105 (and therefore the binary NRZ signal on line 250) by half a period of the clock signal on line 87. The delay may be, for example, on the order of about 10 μsec. The output timing pulse is then one-half period of the clock signal on line 87, also about 10 μsec.

The waveforms on the data out line 255 and timing signal output line 257 are copies of the BNRZ (binary nonreturn to zero) output of the sampling flip-flop 120 and the sampling pulses at the output from the output of the divide-by-2 circuit 105, except that the timing signal output on line 257 is delayed one half period of the period of the divided clock pulses on line 100.

Figure 15:
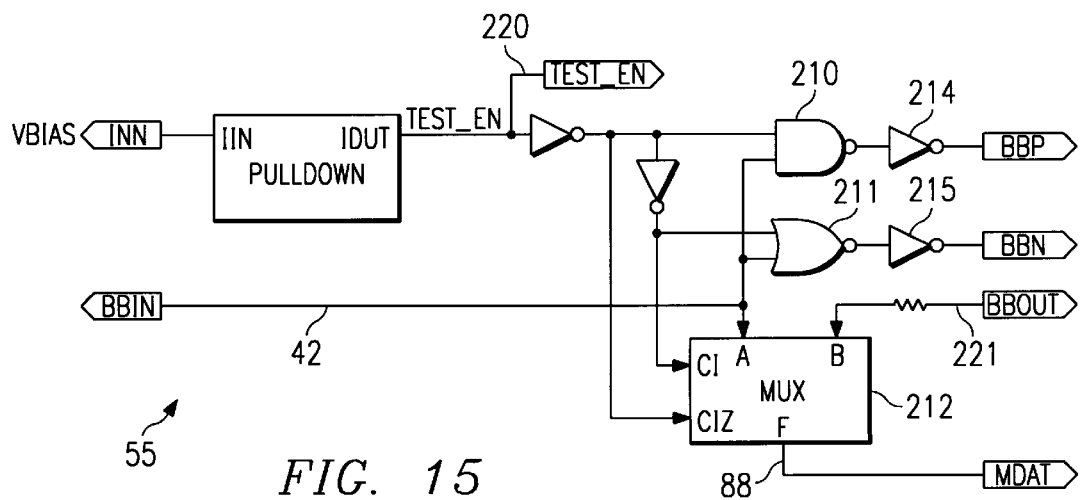
FIG. 15 is an electrical schematic diagram of a test mode select circuit for use in the timing recovery and decoding system of FIG. 5.

In contrast to normal circuit operation, described below, the timing recovery and Manchester data decoding system 34 provides for a test mode, in which a test signal can be applied to the circuit via a test mode control circuit 55, shown in FIG. 15. Thus, the circuit 34 normally receives the Manchester data containing signal (MDAT) at its the multimode input stage 41 under the control of the mode control circuit 160, details of which are shown in FIG. 12. However, in order to provide a test mode of operation, with reference again to FIG. 15, the output from the multimode input stage 41 is connected on line 42 to the inputs of a NAND gate 210, a NOR gate 211, and a multiplexer circuit 212. The outputs from the NAND gate 210 and NOR gate 211 are inverted respectively by inverters 214 and 215, and may be used for desired test or monitoring purposes.

The multiplexer circuit 212 normally produces the Manchester data containing signal on line 42 at its output on line 88 to the remaining circuitry, as discussed above. However, if a high test enable signal is applied to the test enable line 220, a Manchester data containing test signal that is applied on the line 221 is delivered to the output line 88.

As indicated above, the timing recovery and Manchester data decoding system 34 has three operating modes, depending upon the conditions established by the Manchester data contained in the input signal. The three operating modes provide for an adaptive threshold detection scheme of operation, depending upon the character and nature of the input signal. The first operating mode is the "steady-state" mode, as described above, in which a signal that contains a Manchester encoded data stream is processed and an output binary NRZ signal is produced at the output. The second operating mode is an "offset" mode in which the circuit 34 is "sleeping," during which the occurrence of a wake up Manchester data sequence is needed to cause the circuit to "wake-up" to assume and resume the "steady-state" operating mode. The third operating mode is a "hold" mode in which the circuit operates between the detection of the wake up sequence and reception of normal data, during which the circuit biases are maintained, even though steady-state mode Manchester encoded data is not being received.

The particular mode in which the circuit operates depends upon how the comparator 46 is biased by the switches 50 and 53. Thus, the switches 50 and 58 are operated to select one of three reference voltage settings, based on signal conditions detected from monitoring the Manchester transition indication waveform in response to the signals on line 238 of the mode control circuit 160 shown in FIG. 12.

Figure 16A:
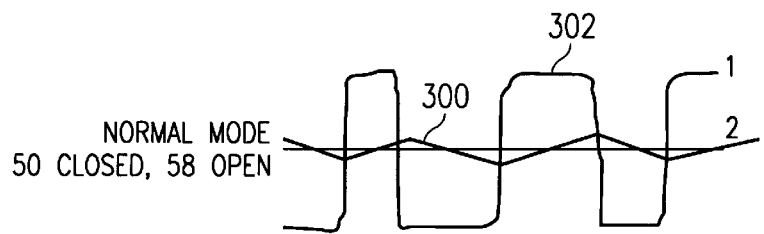
FIGS. 16a–c are illustrative electrical waveforms showing the output signals from the threshold detector circuit of FIG. 15 in each of the operating modes of the timing recovery and decoding system of FIG. 5.
Figure 16B:
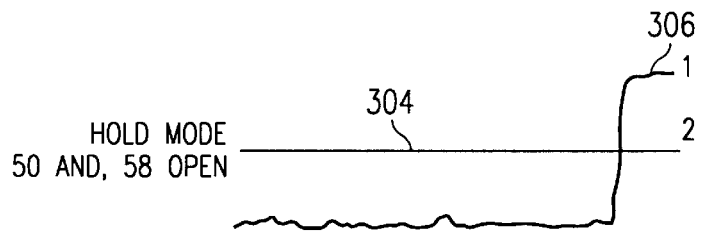
Figure 16C:
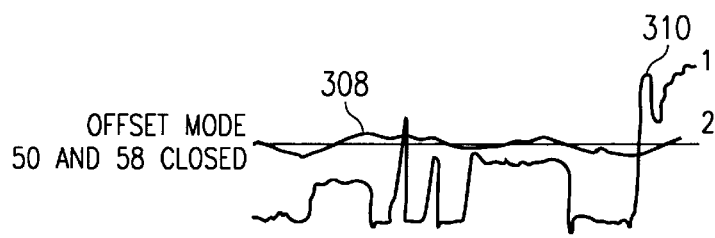

The waveforms produced for the three reference voltage settings are outlined in FIGS. 16a–c. With reference also again to FIG. 5, as is apparent the time constant at node 2 at the inverting input of the comparator 46 is much greater than at node 1 at the noninverting input of the comparator 46. Consequently, node 2 responds primarily to the long term average of the DASK (Demodulated ASK) signal whereas node 1 responds to DASK data transitions. In the "steady-state" mode of operation, having waveforms shown in FIG. 16a, switch 50 is closed and switch 58 is open. In the "steady-state" mode, the reference voltage 300 at node 2 will equal the average value of the signal 302 at node 1. Since the average value of the Manchester data is always centered between the high and low levels, maximum noise immunity is achieved.

In the "hold" mode, having waveforms shown in FIG. 16b, both switches 50 and 58 are open. Since there is no discharge path, the capacitor 60 on node 2 holds the previous voltage, seen as waveform 304. For transmission formats that contain bursts of data separated by short dead time intervals, such as represented by waveform 306, the "hold" mode retains the optimum threshold between bursts of valid data.

In the "offset" mode, having waveforms shown in FIG. 13c, the reference voltage 308 at node 2 is offset from the average value of the noise at node 1. The offset voltage is chosen so that the reference is approximately at the midpoint of the high and low levels of the weakest valid signal 310 expected at node 1. This mode is used during long dead time intervals. Comparator output noise is suppressed far below that which is seen in most remote control receivers where the reference voltage is allowed to become equal to the noise average value.

Figure 17:
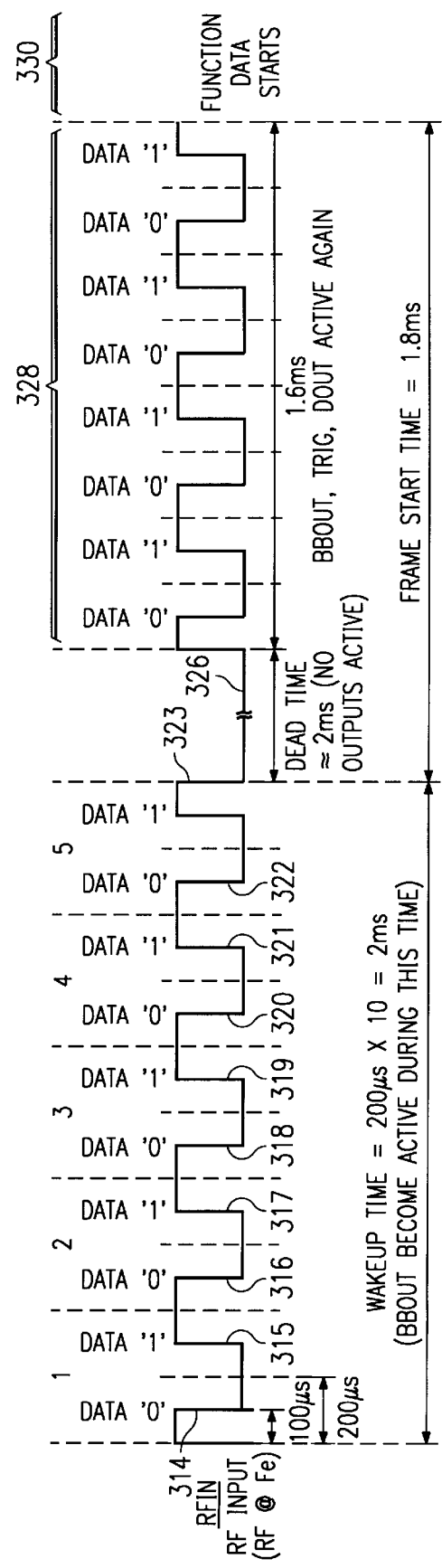
FIG. 17 shows a waveform pulse series with a wake-up sequence and short dead time interval that may be employed in the circuit of the present invention.

Although the comparator noise immunity in the "offset" mode may not be as good as in the "steady-state" mode, a simple transmission format combined with further signal processing can nearly eliminate the possibility of a false wake-up sequence followed by noise at the data out line 255 (FIG. 14). A format with a wake-up sequence and short dead time interval such as shown in FIG. 17 may be used. As can be seen, the wake-up sequence includes a number of similar pulse transitions 314–323, followed by a dead time interval 326, which, in turn is followed by the desired Manchester data stream 328,330. In the embodiment illustrated, an initial sequence of 8 Manchester transitions 328 is sent to assure proper synchronization, although this is not absolutely necessary. After the synchronizing sequence 328, the actual Manchester data of interest 330 is transmitted. With this format, the data out on line 255 and the timing pulses on output line 257 from the output control circuit 125 (FIG. 14) are only active after a valid wake-up sequence and short dead time have occurred. They will remain active until another dead time interval is detected.

The mode control circuit 160 responds to the Manchester transition indicating pulse and divided clock pulses on line 100 to determine the appropriate comparator reference mode. During a long dead time, the "offset" mode is in effect, and any detected transitions of the transition indicating pulse starts a candidate wake up sequence. The comparator 46 remains in the "offset" mode until a valid wake up is detected. A valid wake up consists of a predetermined number of properly spaced sequential transitions. For proper spacing, the separation between any two transitions must be less than three symbol widths. This is determined by counting the divided clock pulses on line 100 following every transition. If the count reaches three, the sequence is rejected and starts over at the next detected transition.

More particularly, as shown in FIG. 18, the waveforms at various nodes of the input circuit 41 are shown in greater detail. During a wake up sequence, the reference for the comparator 46 charges toward a final value of the signal average plus offset, shown by curve segment 340. Following wake up, the reference is switched to "normal" mode at point 342. As is apparent from the figure, during wake up the reference charges more quickly toward the average value than it would if "steady-state" mode were used. This is due to both the reduced time constant and the presence of an offset voltage. Since in the embodiment illustrated there are twelve transitions in the wake up burst, but only four are required for wake up, the system will ordinarily be awake before the entire burst is complete. Although this allows additional time for the reference to settle toward the true average value, it is obviously advantageous if it is already close when "steady-state" mode is switched in. This is particularly true for very weak signals or high noise conditions where wake up can occur near or at the end of the wake up burst.

After the circuit has been awakened, a short dead time occurs in region 344. (It should be noted that the dead time region 344 illustrated in FIG. 18 has been shortened for purposes of illustration. A typical dead time may be, for example on the order of 2 milliseconds, or longer.) The data out signal on line 255 and the timing pulses on line 257 are enabled at the end of the short dead time that follows wake up. This hold off prevents outputting data from the remaining portion of the wake up burst. The short dead time is detected by counting the divided pulses on line 100 following each Manchester transition pulse. If the count reaches three, a short dead time is initiated and the comparator reference is switched to hold mode. These settings remain in effect until either detected transitions resume or the count of divided clock pulses on output line 100 reaches 64. If detected transitions occur first, the count of the divided clock pulses on output line 100 is set to zero, the comparator reference is set to the "steady-state" mode, the outputs are enabled, and decoded data and timing pulses or triggers appear at respective output lines 255 and 257.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. An apparatus for decoding a Manchester encoded data stream comprising:

a transition detector for receiving the Manchester encoded data stream to produce a transition indicating output when a transition of the Manchester encoded data stream is detected;

a circuit to generate an output control pulse a predetermined time after said transition indicating output is produced;

a sampling flip-flop receiving the Manchester encoded data stream, controlled by the output control pulse to output a state of the Manchester encoded data when said output control pulse is generated, said apparatus further comprising a clock generator for generating a clock pulse stream at a frequency higher than said Manchester encoded data stream, wherein said transition detector is connected to receive said clock pulse stream and wherein said transition detector is configured to synchronize the transition indicating output with a pulse of said clock pulse stream.

2. An apparatus for decoding a Manchester encoded data stream, comprising:

a transition detector for receiving the Manchester encoded data stream to produce a transition indicating output when a transition of the Manchester encoded data stream is detected;

a circuit to generate an output control pulse a predetermined time after said transition indicating output is produced;

a sampling flip-flop receiving the Manchester encoded data stream, controlled by the output control pulse to output a state of the Manchester encoded data when said output control pulse is generated, said apparatus further comprising a phase selector to select a known half of a Manchester data cell occurring after a transition.

3. The apparatus of claim 2 wherein said phase selector selects a second half of a Manchester data cell.

4. The apparatus of claim 2 wherein said phase selector selects a first half of a Manchester data cell.

5. The apparatus of claim 4 further comprising an inverter to invert the output from said flip-flop.

6. A timing recovery and Manchester data decoding system, comprising:

an oscillator providing output pulses;

a multimode input circuit connected to receive an input signal that may contain a Manchester encoded data signal and to output a data containing signal;

a transition detector connected to receive the output signal from the multimode input circuit for generating a Manchester transition indicating pulse at every Manchester data transition;

a Manchester transition counter circuit connected to receive the output pulses from the oscillator to produce a predetermined number of oscillator pulses after a Manchester data transition;

a divide-by-2 circuit connected to receive the oscillator pulses from the Manchester transition counter circuit to generate a sample command signal;

and a sampling circuit connected to receive the output from the divide-by-2 circuit and the Manchester encoded data to latch the a state of the Manchester encoded data in response to the output from the divide-by-2 circuit.

7. The timing recovery and Manchester data decoding system of claim 6 further comprising:

a pulse generator circuit connected to receive output pulses from said oscillator and produce an output count thereof;

a mode decoder circuit connected to receive the output count from said pulse generator circuit to provide outputs on preselected counts of said output count from said pulse generator circuit;

and a mode control circuit connected to receive at least some of the outputs of said mode decoder circuit, said mode control circuit being connected to selectively control the mode of said multimode input circuit.

8. The timing recovery and Manchester data decoding system of claim 7 wherein said mode decoder circuit is a logic gate array.

9. The timing recovery and Manchester data decoding system of claim 6 further comprising:

an output control circuit connected to receive the data latched by said sampling circuit and said transition indicating pulses for producing an NRZ output data signal and output timing pulses.

10. The timing recovery and Manchester data decoding system of claim 9 further comprising a circuit to delay the output timing pulses by one half cycle.

11. The timing recovery and Manchester data decoding system of claim 6 wherein said multimode input circuit has a "steady-state" mode in which a signal that contains a Manchester encoded data stream is processed and an output binary NRZ signal is produced at the output, an "offset" mode during which the occurrence of a wake up Manchester data sequence is needed to cause the circuit to "wake-up" to assume and resume the "steadystate" operating mode, and a "hold" mode during which circuit biases are maintained even though "steady-state" mode Manchester encoded data is not being received.

12. The timing recovery and Manchester data decoding system of claim 6 further comprising a test mode control circuit for controlling whether the input signal or a test signal is processed.

13. The timing recovery and Manchester data decoding system of claim 6 wherein said multimode input circuit comprises:

a comparator with inverting and non-inverting inputs;

a first resistor by which the input signal is connected to the non-inverting input;

a second resistor by which the input signal is applied connected to the inverting input;

a first switch function in series with the second resistor;

a third resistor connected at one end to the inverting input of the comparator;

a second switch function connected between another end of said third resistor and a reference voltage;

a first capacitor connected between the inverting and non-inverting input of the comparator;

and a second capacitor connected between the non-inverting input of the comparator and ground;

said first and second switch functions being controlled by said mode control circuit.

14. A wake up circuit for initiating operation of a Manchester encoded data detector from a quiescent state in response to a Manchester data wake up sequence in an input signal; comprising:

an input circuit with a hold mode which is initially off to receive the input signal when the Manchester encoded data detector is in the quiescent state to produce a data output signal corresponding to a sampled state of the input signal;

an offset circuit which is initially on to receive the input signal to compare the input signal to a voltage reference derived from an input signal average value plus a predetermined offset voltage to produce a data output signal corresponding to the difference between the voltage reference and the input signal;

a circuit for determining if a possible Manchester encoded data cell has been received in the data output signal from the sample and hold circuit to selectively switch said offset circuit on;

and a circuit for determining if a predetermined number of data cells have been sequentially received with respective predetermined states within said data output signal of said offset circuit to selectively switch said offset circuit off.

15. The wake up circuit of claim 14 further comprising a differential amplifier having inverting and noninverting inputs and an output, and wherein:

said input circuit comprises a first capacitor connected between said inverting input and a reference potential, and a second capacitor connected between said noninverting input and said reference potential, and a first resistor connected between said input signal and said inverting input, wherein said data output signal is produced at the output of said differential amplifier;

said offset circuit comprises a first resistor connected between said inverting input of said differential amplifier and said voltage reference, a second resistor connected between said inverting input and said input signal, and a switch connected in series with said second resistor to turn said offset circuit on, wherein said output of said differential amplifier produces said data output signal corresponding to the difference between the voltage reference and the input signal when said first switch is closed; and said differential circuit comprises a second switch in series with said second resistor, wherein when said second switch is closed and said first switched is opened, said output of said differential amplifier produces said amplified input signal.

16. A method for decoding Manchester encoded data to produce a nonreturn to zero binary representation of the data, comprising:

producing a pulse for each transition of the Manchester encoded data;

generating a sampling signal in timed phase with the pulse for each transition of the Manchester encoded data;

latching the Manchester encoded data at each occurrence of the sampling signal and producing an output of the latched data;

and using adaptive threshold detection to receive the Manchester encoded data with enhanced noise immunity, wherein said step of using adaptive threshold detection comprises providing a plurality of operating modes at a data input stage of a decoding circuit.

17. The method of claim 16 wherein said step of providing a plurality of operating modes comprises providing steady-state" and "offset" modes of operation.

18. A method for producing an NRZ data signal corresponding to states of a known half of each Manchester cell in a Manchester data stream, comprising:

generating a transition pulse at each transition in the Manchester data stream;

generating a series of timing pulses having a frequency n times a frequency of said Manchester cells in said Manchester data stream;

restarting said series of timing pulses in response to each transition pulse;

latching a current state of a Manchester cell upon the occurrence of each $m^{th}$ timing pulse, wherein m greater than n/2;

counting said timing pulses to provide a timing pulse count;

restarting said counting in response to each transition pulse; and if said timing pulse count becomes greater than n/2, advancing said latching to latch said Manchester data stream upon the next $(n/2)^{th}$ occurring timing pulse.

19. The method of claim 18 wherein said multiple of the frequency of said timing pulses is twice the frequency of said Manchester data stream, and wherein n is 2.

20. A method for producing an NRZ data signal corresponding to second half states of Manchester cells in a Manchester data stream, comprising:

generating series of timing pulses having a frequency half of a frequency of said Manchester cells in said Manchester data stream;

latching a current state of a Manchester cell upon the occurrence of each second timing pulse;

detecting the occurrence of a double wide pulse in said Manchester data stream;

and resynchronizing said latching to begin on a next occurring timing pulse after said double wide pulse has been detected.

21. Apparatus for producing an NRZ data signal corresponding to second half states of Manchester cells in a Manchester data stream, comprising:

an oscillator to produce a stream of clock pulses;

a pulse generator connected to receive said Manchester data stream for generating an output pulse at each transition in said Manchester data stream;

a divide-by-n counter connected to be clocked by said clock pulses from said oscillator, said divide-by-n counter having an output that changes state after a predetermined number of said clock pulses;

a timing flip-flop connected to be clocked by said output from said divide-by-n counter, said flip-flop being connected to produce an output on every second count of said output from said divide-by-n counter;

a sampling flip-flop connected to receive said Manchester data stream on a data input and an output of said timing flip-flop on a clock input, said sampling flip-flop providing a state of said Manchester data stream at an output when said sampling flip-flop is clocked;

and a sequence counter connected to receive said output of said divide-by-n counter on a clock input and said output pulses from said pulse generator on a reset input, whereby said sequence counter produces a signal indicating when a double wide Manchester pulse has occurred, said signal being connected to reset said sampling flip-flop.

* * * * *